Patented Oct. 29, 1935

2,018,813

UNITED STATES PATENT OFFICE 2,018,813

MU-ARYLENE-THIAZOLE AND ARYLENE OXAZOLE SULPHONIC ACID

Max Schubert, Frankfort-on-the-Main-Fechenheim, and Ernst Herdieckerhoff, Opladen, near Cologne-on-the-Rhine, Germany, assignors to General Aniline Works, Inc., New York, N. Y., a corporation of Delaware No Drawing. Application May 2, 1934, Serial No. 723,611. In Germany May 11, 1933

5 Claims. (Cl. 260—44)

Our invention relates to heterocyclic acids and process of making same.

We have found that new hitherto unknown sulphonic acids of the general formula

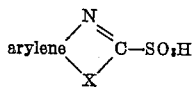

wherein arylene means a radicle of the benzene or naphthalene series and X stands for S or O, are obtained by treating the corresponding 2-mercapto-compounds of the arylene-thiazole and -oxazole series in an alkaline medium with a quantity of an oxidizing agent corresponding to at least 3 reactive oxygen atoms.

The smooth formation of the present new sulphonic acids is very surprising since the lability of the thiazole and oxazole ring systems particularly under the influence of oxidizing agents is known in literature.

The present new sulphonic acids are generally colorless powders which are water-soluble in contradistinction to the corresponding disulphides, which are obtainable by oxidizing the same 2-mercapto-compounds in an acid medium (with nitrous acid). When heated with the addition of an acid such as hydrochloric acid they split off sulphur dioxide. They form water-soluble alkali metal salts which represent generally colorless crystalline powders and yield when reduced with sodium amalgam the corresponding fundamental compounds by replacing the sulphonic acid group by hydrogen in an analogous manner as known with regard of the α-sulphonic acids of the naphthalene series.

The new sulphonic acids are important intermediates for the formation of dyestuffs and pharmaceutical products.

In order to further illustrate our invention the following examples are given, the parts being by weight and all temperatures in centigrade degrees; but we wish it, however, to be understood that our invention is not limited to the examples given, nor to the exact conditions stated therein:—

Example 1

8.4 parts of 2-mercapto-benzothiazole are dissolved in about 50 parts of a dilute caustic soda solution containing 40 parts of caustic soda in the liter and at about 80° C. 85 to 100 parts of a technical sodium hypochlorite solution containing about 17% of reactive chlorine are slowly added while stirring. While hot the reaction liquor is purified by filtration. When cool a colorless crystal mass separates which is filtered off and dried. The thus formed sodium salt is very easily soluble in water and separates when recrystallized from little water in the form of colorless leaflets.

When acting according to Friedländer and Lucht, Ber. d. deutsch. Chem. Ges., vol. 26, page 3,028, with sodium amalgam on the aqueous solution thereof benzothiazole is formed which can be isolated with a good yield as a substance of 230° C. boiling point when extracting the reaction mass with ether.

When acidifying the concentrated solution of the sodium salt for instance with hydrochloric acid in the cold the free benzothiazole-2-sulphonic acid of the formula

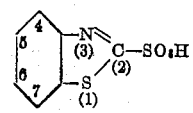

is obtained which crystallizes as needle-shaped aggregates, which are easily soluble in alcohol and split off sulphur dioxide when warmed with the addition of hydrochloric acid.

The yield is nearly the theoretical one.

If a concentrated aqueous solution of 6 parts of hydrogen peroxide is allowed to act on a solution of 8, 4 parts of 2-mercapto-benzothiazole in about 150 parts of a dilute caustic soda solution containing 40 parts of caustic soda in the liter by saturating the mass with sodium chloride the sodium salt of the benzothiazole-2-sulphonic acid can be likewise isolated with an excellent yield.

Example 2

11 parts of 2-mercapto-6-ethoxy-benzothiazole are dissolved in about 100 parts of a hot dilute caustic soda solution containing 40 parts of caustic soda in the liter. While stirring slowly 120 parts of a technical sodium hypochlorite solution as used in Example 1 are added, the mixture is boiled off and separated while hot from some impurities by filtration. From the filtrate when cool a crystal mass separates which is filtered off and dried. It represents the sodium salt of the 6-ethoxy-benzothiazole-2-sulphonic acid of the formula

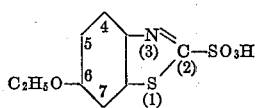

The sodium salt is easily soluble in water and crystallizes from alcohol as colorless leaflets. By reduction with sodium-amalgam it yields the 6-ethoxy-benzothiazole of 56° C. to 58° C. melting point, which crystallizes as colorless needles from petrolether.

The same sulphonic acid is obtained with a likewise excellent yield when adding to a solution of the same quantity of the initial product in about 100 parts of a dilute caustic potash solution containing 56 parts of caustic potash in the liter, at about 80° C. to 90° C. slowly 16 parts of potassium permanganate, keeping the mixture at this temperature until decoloration occurs, removing the separated manganese dioxide by filtration and isolating the formed potassium salt of the sulphonic acid by adding sodium chloride to the solution.

*Example 3*

14.3 parts of 2-mercapto-6-benzoyl-amino-benzothiazole are dissolved in 55 parts of a dilute caustic soda solution as used in the foregoing examples, then at about 35° C. about 96 parts of a technical sodiumhypochlorite solution are added and the mixture is heated for about 2 hours at 70° C. to 80° C. When cool the precipitated colorless product which represents the sodium salt of the 6-benzoyl-amino-benzothiazole-2-sulphonic acid of the formula

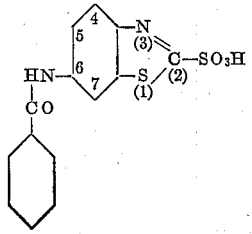

is washed out with salt water until a neutral reaction and dried.

Likewise 2-mercapto-4-methyl-6-chloro-benzothiazole and the 2-mercapto-6,7-benzo-benzothiazole can be transformed by the action of corresponding quantities of suitable oxidants in an alkaline medium into the 4-methyl-6-chloro-benzothiazole-2-sulphonic acid of the formula

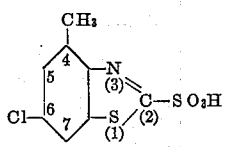

and 6,7-benzo-benzothiazole-2-sulphonic acid respectively of the formula

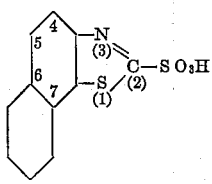

*Example 4*

To a solution of 8.8 parts of 6-nitro-2-mercapto-benzothiazole in about 100 parts of a dilute caustic soda solution containing 40 parts of caustic soda in the liter while well stirring about 120 parts of the technical sodium-hypochlorite solution as used in the foregoing examples is added at about −5° C. to 0° C. After stirring at this temperature for some time the precipitate is filtered off, washed out with salt water and dried at temperatures of about 30° C. to 40° C. In this manner with a nearly theoretical yield the sodium salt of the 6-nitro-benzothiazole-2-sulphonic acid of the formula

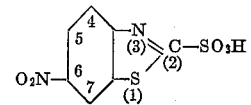

is obtained.

*Example 5*

12 parts of 2-mercapto-benzothiazole-5-sulphonic acid are dissolved in about 20 parts of water and 10 parts of a concentrated caustic soda solution of 50% strength and at about 0° C. slowly 66 parts of the technical sodium hypochlorite solution are added.

During the oxidation slowly white crystals separate, which are isolated in the usual manner. They represent the sodium salt of the benzothiazole-2,5-disulphonic acid of the formula

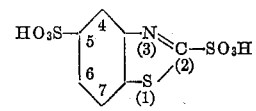

*Example 6*

10 parts of 2-mercapto-benzooxazole are dissolved in about 6 parts of a caustic soda solution of 50% strength and about 30 parts of water and slowly at about 5° C. to 10° C. about 96 parts of the sodium hypochlorite solution as used in the foregoing examples are added. The formed sodium salt of the benzooxazole-2-sulphonic acid of the formula

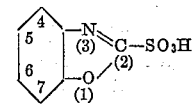

is isolated in the usual manner. It represents a white water-soluble powder which when warmed splits off sulphur dioxide.

*Example 7*

13 parts of 2-mercapto-β-naphthoxazole are dissolved in about 6 parts of a caustic soda solution of 50% strength and about 50 parts of water and at about 10° C. slowly 90 parts of the sodium hypochlorite solution as used in the foregoing examples are added. The white sodium salt of the naphthoxazole-2-sulphonic acid of the formula

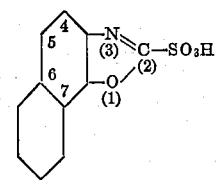

separates which may be purified by redissolving it in warm water and adding sodium-chloride to the aqueous solution. When warmed it separates sulphur dioxide.

*Example 8*

17 parts of 2-mercapto-β-naphthoxazole are dissolved in about 20 parts of a caustic soda solution of 50% strength and 50 parts of water and at temperatures from about —2° C. to 0° C. very slowly 45 parts of a hydrogen peroxide solution of 25% strength are added during 5 to 8 hours. Some quantity of the sodium salt of the 2-hydroxy-β-naphthoxazole formed as by-product are removed by filtration and from the filtrate the sodium salt of the 2-sulphonic acid as described in the foregoing Example 7 is isolated.

We claim:—

1. Sulphonic acids of the general formula

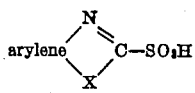

wherein arylene means a radicle of the benzene or naphthalene series and X stands for S or O, which products are mostly colorless water-soluble powders which split off sulphur dioxide when heated with the addition of hydrochloric acid, which form water-soluble alkali metal salts which represent mostly colorless crystalline powders and yield when reduced with sodium amalgam the corresponding fundamental compounds by replacing the sulphonic acid group by hydrogen.

2. Sulphonic acids of the general formula

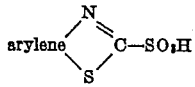

wherein arylene means a radicle of the benzene or naphthalene series, which products are mostly colorless water-soluble powders, which split off sulphur dioxide when heated with the addition of hydrochloric acid, which form water-soluble alkali metal salts which represent mostly colorless crystalline powders and yield when reduced with sodium amalgam the corresponding fundamental compounds by replacing the sulphonic acid group by hydrogen.

3. The benzothiazole-2-sulphonic acid of the formula

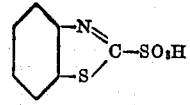

which crystallizes as needle-shaped aggregates, which is easily soluble in alcohol and splits off sulphur dioxide when warmed with the addition of hydrochloric acid, which forms easily water-soluble crystalline alkali metal salts, which yield when reduced with sodium amalgam benzothiazole.

4. The 6-ethoxy-benzothiazole-2-sulphonic acid of the formula

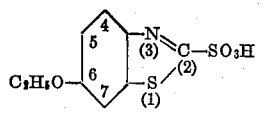

which represents a water-soluble powder forming easily water-soluble crytalline alkali metal salts, which yield when reduced with sodium-amalgam the 6-ethoxy-benzothiazole.

5. The 6-benzoyl-amino-benzothiazole-2-sulphonic acid of the formula

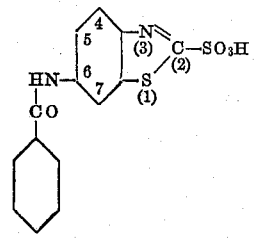

which represents a water-soluble powder forming easily water-soluble crystalline alkali metal salts.

MAX SCHUBERT.
ERNST HERDIECKERHOFF.